United States Patent
Schmitt

(10) Patent No.: US 10,778,749 B2
(45) Date of Patent: Sep. 15, 2020

(54) METHOD, COMPUTER PROGRAM AND SYSTEM FOR TRANSMITTING DATA IN ORDER TO PRODUCE AN INTERACTIVE IMAGE

(71) Applicant: Siemens Aktiengesellschaft, Munich (DE)

(72) Inventor: Clemens Schmitt, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 273 days.

(21) Appl. No.: 15/762,943

(22) PCT Filed: Sep. 23, 2016

(86) PCT No.: PCT/EP2016/072744
§ 371 (c)(1),
(2) Date: Mar. 23, 2018

(87) PCT Pub. No.: WO2017/050997
PCT Pub. Date: Mar. 30, 2017

(65) Prior Publication Data
US 2018/0288131 A1    Oct. 4, 2018

(30) Foreign Application Priority Data
Sep. 24, 2015 (DE) .......... 10 2015 218 346

(51) Int. Cl.
*H04L 29/08* (2006.01)
*G06F 16/51* (2019.01)
(Continued)

(52) U.S. Cl.
CPC .............. *H04L 67/06* (2013.01); *G06F 16/51* (2019.01); *G06Q 10/063* (2013.01); *H04L 67/1097* (2013.01); *H04L 67/42* (2013.01)

(58) Field of Classification Search
CPC combination set(s) only.
See application file for complete search history.

(56) References Cited

U.S. PATENT DOCUMENTS

2004/0196286 A1* 10/2004 Guzik ................... G06T 11/206
                                                            345/440
2009/0229819 A1    9/2009 Repin et al.
(Continued)

OTHER PUBLICATIONS

Anonymous: "Gnuplot 5.0 demo scripts run through the HTML canvas terminal—See also the demo output for the PNB and SVG terminals"; 2015.

(Continued)

*Primary Examiner* — Jeffery A Brier
(74) *Attorney, Agent, or Firm* — Cozen O'Connor

(57) ABSTRACT

A method for transmitting data to produce an interactive image, to a computer program for implementing the method and a client-server system operating based on the method, wherein the data include data that are already recorded and data that are added as a result of continuous measurements, where a server produces a static image and transmits it to the client for display, produces dynamic image data and transmits this to the client for display, produces an updated static image based on data present at a relevant time point or as a combination of prior static image and the dynamic image data and transmits the updated static image to the client for display instead of the previous static image and the dynamic image data such that large volumes of static and dynamic data can be displayed on the client via a small data transfer between the server and the client.

16 Claims, 6 Drawing Sheets

(51) Int. Cl.
*G06Q 10/06* (2012.01)
*H04L 29/06* (2006.01)

(56) References Cited

U.S. PATENT DOCUMENTS

| | | | | |
|---|---|---|---|---|
| 2010/0079462 A1* | 4/2010 | Breeds | ............... | G06T 11/206 |
| | | | | 345/440 |
| 2010/0271479 A1* | 10/2010 | Heydlauf | ......... | G01N 33/54366 |
| | | | | 348/143 |
| 2013/0169644 A1* | 7/2013 | Bolton | ................. | H04Q 9/00 |
| | | | | 345/440 |
| 2014/0250153 A1 | 9/2014 | Nixon et al. | | |

OTHER PUBLICATIONS

Anonymous: "Highcharts—Preprocessing live data", 2014.
Anonymous: "Highcharts—Preprocessing data from a database", 2014.
Diercks, S.: "Design und Implementierung einer Bibliothek für Webbrowser-basierte Bedienoberflachen von Mess—und Regelanwendungen auf Ethernet-fähigen Mikroprozessorsystemen"; Diplomarbeit; Hochschule für Angewandte Wissenschaften Hamburg; Fakultät Technik und Informatik; presented Aug. 15, 2008 [online]; pp. 1-131.
Ragget, D. et al.: "HTML 4.01 Specification; W3C Proposed Recommendation"; 1999; pp. 1-389; 1999.
Anonymous: "css3—Overlay Htmls canvas over image—Stack Overflow", 2013.
Williams T. et al.: "gnuplot 4.6 An Interactive Plotting Program", Thomas Williams, 2014.
Anonymous, "Graphical user interface", Wikipedia, Sep. 10, 2015, 12 pages, XP055689506.

\* cited by examiner

METHOD, COMPUTER PROGRAM AND SYSTEM FOR TRANSMITTING DATA IN ORDER TO PRODUCE AN INTERACTIVE IMAGE

CROSS-REFERENCE TO RELATED APPLICATIONS

This is a U.S. national stage of application No. PCT/EP2016/072744 filed Sep. 23, 2016. Priority is claimed on German Application No. DE 10 2015 218 346.7 filed Sep. 24, 2015, the content of which is incorporated herein by reference in its entirety.

BACKGROUND OF THE INVENTION

1. Field of the Invention

The invention relates to a method for transmitting data to produce an interactive image via a system in which a first device functions as a server and a second device communicatively connected to the first device functions as a client, relates to a system operating in accordance with the method and to a computer program for implementing the method.

2. Description of the Related Art

The quality of a representation of data, for example, on a computer screen of a client of a client-server system is determined, inter alia, by a respective data quantity and the transfer speed enabled by the communicative connection between the client and the server, for example, a conductor-bound or conductor-free connection. With a data quantity of, for example, 200 MB on the server side, at a transfer speed of 100 Mbit/s (fast Ethernet), a transfer time of 17 seconds results. This is significantly too long for a visualization of the data occurring at least approximately in real time.

A trivial solution for transmitting data to produce an interactive image from the large static data quantity via a device (client) remote from the storage location of the data quantity (server) lies in reducing the data quantity and transferring only the reduced data quantity to the client for display at this location. The reduction of the data quantity, however, necessarily leads thereto that on the client side, data is lacking and that therefore no interactive access by a user thereto is possible. In addition, such a trivial solution enables no consideration of further data arriving dynamically in addition to the static data quantity.

A good interactivity, i.e., access to the complete data quantity is therefore seemingly not combinable with a rapid image representation, particularly a rapid image representation taking into account dynamically arriving additional data.

SUMMARY OF THE INVENTION

In view of the foregoing, it is therefore an object of the present invention to provide a method, computer program and system via which a large server-side static data quantity together with further data arriving dynamically in addition to the static data quantity, given a necessarily limited transfer speed of the communicative connection between the server and the client, can be represented sufficiently rapidly on the client side.

This and other objects and advantages are achieved in accordance with the invention by a system, a device and method for transmitting data in which a representation of mass data (or "big data") in the form of an interactive image on the client is possible despite the bottleneck of the low transfer speed between a server and client. This can involve already existing (historical) data and data added (live data) during the representation. For differentiation, the already existing data is designated "static" data and newly added data is accordingly designated "dynamic" data. A data point of the static or dynamic data can itself be a collection of data. A data point comprises at least one measurement value or the like and optionally, for example, information on boundary conditions during its recording (e.g., a temperature recorded at a turbine as a measurement value, where as a boundary condition an angle defining a rotational position of the turbine shaft during the measurement value recording is included in the data point as a boundary condition).

In a method in accordance with the approach proposed herein, for transmitting the data to produce an interactive image via a system in which a first device functions as a server and a second device communicatively connected to the first device functions as a client, and where the data is provided in the form of data points, the following is provided:

Based on data stored or temporarily stored in a database, i.e., static data and the static data points encompassed thereby, the server therefore generates an image designated a static image and transmits it to the client. The client represents the static image received from the server via a display unit. Thereby, a visualization of the previously available (static) data occurs via the client. The generation of the static image causes a reduction of the data quantity of the underlying static data points, although the user of the client receives the impression when observing the static image that the complete data quantity is displayed by the static image. The image can also be generated in a compressed format or at least transferred in the compressed format. Compressed image formats and methods for generating compressed images are per se known.

The server continuously receives additionally established data points, i.e., dynamic data that is stored or temporarily stored in the database. The server transmits this dynamic data or dynamic image data generated based on the dynamic data to the client. The client represents the static image together with the dynamic image data received from the server or together with dynamic image data generated by the client based on the dynamic data received from the server, via the display unit. In this way, the static image represented by the client is continuously updated via dynamic image data. The data transmission to the client takes place in the form of at least one data point or in the form of image data generated, on the basis thereof. In exactly the same way, a grouping together of a plurality of data points or resultant image data is possible and is also included by the approach proposed, here.

Following a pre-defined or pre-definable time span or following a pre-defined or pre-definable number of additionally established data points, the server generates an updated static image. This occurs based on the data points stored in the database which comprises the data points on the basis of which the preceding static image was generated, and the data points added thereafter, or alternatively based on the preceding static image and the additionally established data points. This updated static image is transmitted via the server to the client. The client represents the updated static image received from the server in place of the previously displayed static image and the previously displayed dynamic image data via the display unit.

This procedure can be repeated cyclically until the visualization of the data via the client is terminated.

The advantage of the solution proposed here lies therein that the transmitting of the data to the client is divided without this being obvious to the user. In a first step, based on previously existing data (static data), a graphic display designated here, and hereinafter, as an image is generated by the server utilizing its computational capacity and this is transmitted to the client for representation. Based on the data quantity of the resulting image that is significantly smaller as compared with the data quantity of the underlying data, the transmission of the image to the client and the representation of the image there occurs very rapidly. As soon as the image is represented at the client, a possibility arises for the user of visual interpretation of the data and the undertaking of operating actions in relation to the image. Data arriving later (dynamic data) is added to the static image effectively incrementally and the transfer of the low data quantities necessary for this also occurs very rapidly. After a certain time, the dynamic data is accepted into the static image and this updated static image is transmitted—just like the preceding static image, i.e., due to the data quantity, again very rapidly—to the client and there is represented via the display unit. The cyclic adoption of the dynamic data into an updated static image has the advantage, for example, that the memory storage requirement of dynamic or static data structures on the client side for intermediate storage of the dynamic data or of the dynamic image data generated based on the dynamic data does not grow uncontrolled and need not be selected to be unnecessarily large.

The method in accordance with the invention is an efficient possibility for transmitting data to produce an interactive image given the presence of large static data quantities, for example, historical mass data, and continuously added data, for example, dynamic live data in a client-server system and under the boundary condition of the necessarily restricted transfer speed of the communicative connection there between the server and the, or each, client. It should be noted: The expression "data" used in the preamble includes all data, images and information that is transmitted (in whichever direction) between the server and the client. The expression thus includes at least: static images 30, data points 34 dynamic image data 46, user action-specific coordinates 50 and detail information 48.

References used herein with respect to disclosed embodiments relate to the further development of the subject matter of the main claim with the features of the respective subclaim. They should not be understood as dispensing with the achievement of a self-sufficient subject matter protection for the feature combinations of the backward-referring subclaims. Furthermore, with regard to an interpretation of the claims on a closer specifying of a feature in a subordinate claim, it can be assumed that such a restriction does not exist in the respective preceding claims. Finally, it should be noted that the method set forth here can also be further developed in accordance with the dependent device claims. The same applies for the device, i.e., in particular the client-server system that can be further developed in accordance with the dependent method claims, for example, in that the device comprises means for carrying out the aspects defined in the dependent method claims.

In one embodiment of the method, the client represents the static image received from the server and the image data resulting by reason of the dynamic data in different levels resulting due to individually addressable storage regions. The allocation of image data to different levels and an overlaying of the levels for obtaining the respective image representation are per se known. For differentiation, the different levels are designated the drawing level and the detail drawing level. The static image is represented in the drawing level. The image data resulting as a consequence of the dynamic data is represented in the detail drawing level. For the production of a respective display via the display unit, the contents of the two levels, i.e., the content of the associated storage regions are linked to one another. In a logical OR-linking of the contents of the detail drawing level with the contents of the drawing level, an overlaying of the two levels results and as the result of the overlaying, a combination of the static image and the dynamic data appears as the resultant representation. The use of different levels has the advantage that following a transmission of an updated static image, its display in place of the previously displayed static image and the previously displayed dynamic image data can occur very rapidly. The drawing plane is deleted, for example, in that the storage region addressable as the drawing level is emptied (written with "0"s) and the representation of the updated static image in the drawing level replaces the previously represented static image.

In a particular embodiment of the method, for the visualization of the data in the form of a y/t graph, specifically a graph represented over a continuously updated time axis, a displacement of the visualization following the updating of the time axis is provided at the client. For this purpose, following an initial representation of the static image and in conjunction with an initial representation of the dynamic image data, i.e., before, during or shortly following the representation of the dynamic image data, the representation of the static image is displaced. The displacement occurs in a pre-defined or pre-definable direction, often to the left, so that during observation of the visualization via the client display unit, the impression arises that old data "moves out of the image" leftward. Nevertheless, other displacement directions are equally possible, depending on the usage situation. The displacement occurs over a pre-defined or pre-definable distance or over a distance established individually for each displacement. A pre-defined or pre-definable distance results as the equivalent of a pre-defined or pre-definable time difference Δt. In the case of an individually established distance, this results as an equivalent of a temporal spacing between the last established new data point and the immediately preceding data point. Following a first displacement of the static image, a representation of the dynamic image data at the client occurs in the region becoming free through the displacement of the static image. In relation to cyclically occurring further representations of dynamic image data, in each case, a displacement of the representation of the static image and a displacement, similar in direction and distance, of the representation of the dynamic image data occurs. Due to the displacement of the dynamic image data with the static image, a free region that is available for the representation of new dynamic image data arises repeatedly at one image edge.

If the representation of the static image and the dynamic image data at the client occurs via different levels, then the displacement described above is realizable particularly easily in that in the storage region functioning in each case as a level, the data concerned is displaced.

In a further embodiment of the method in which an interactive image is generated, in the case of a user action relating to the static image or to the image data resulting due to the dynamic data, a detail information item is represented, optionally at the location of the user action. As soon as at least the static image is represented at the client, for the user, a possibility of visual interpretation of the representation and the undertaking of user actions in relation to the image arises. A user action or interaction is, for example, a selection of an image point of the representation. In the case of such a user action, user action-specific coordinates from the client are transmitted to the server. Upon receiving the user action-specific coordinates into the data, in particular into the data points stored in the database, the server establishes an associated data point and transmits its detail information to the client which represents the detail information, in particular at the location of the user action, via the display unit. The quantity of the data to be transferred for this from the client to the server and subsequently from the server to the client is very small and is in the region of a few bytes. Coordinates specific to the user action, for example, the coordinates of the selected image point, are transferred from the client to the server. Subsequently, the detail information belonging to the user action-specific coordinates is transmitted by the server to the client. For the user on the side of the client, the impression arises that any detail information callable with the user action was already originally present at the client, therefore as if the complete set of the visualized (static or static and dynamic) data had been available at the client.

In an embodiment of the method, via which firstly a representation of the static and dynamic data is possible in different levels and, secondly, a representation of a detail information item is possible, the client represents the detail information received from the server in a third level above the drawing level and the detail drawing level and designated hereinafter, for differentiation, the information level. The advantage of the presently contemplated embodiment corresponds to the advantage already disclosed in the use described above of the detail drawing level that is independent of the drawing level. For the representation of different detail information items as a reaction to different user actions, the information level can be rapidly and easily deleted, so that there is room for new detail information. The deletion of the information level does not relate to the representation of the static data or the static data and the dynamic data, so that its representation is always retained regardless of changing representations in the information level.

In one embodiment of a method, via which a representation of a detail information item is possible, the server uses a transformation rule and an inverse of the transformation rule. The server applies the transformation rule upon generation of the static image for converting the static data into image points of the static image. The server applies the inverse of the transformation rule on the user action-specific coordinates received from the client upon a user action there. By applying the inverse, the server establishes the data point belonging to the user action-specific coordinates and subsequently its detail information.

An example will serve to illustrate this further: In a representation of data in a polar diagram, such as data that is recorded at a turbine with regard to a respective momentary rotation angle co of the turbine, the server generates the image to be transmitted to the client in that the totality of the data points included by the recorded data, relating to the rotation angle co and, for example, the amplitude, are entered in the polar diagram. The image to be generated is configured in a per se known manner from image points arranged in rows and columns and thus is based on Cartesian coordinates. For conversion of the polar coordinates of the data points into Cartesian coordinates of the image points, a transformation in the form of the per se known transformation rule for conversion from polar coordinates into Cartesian coordinates is used ($x=r \cos \omega$; $y=r \sin \omega$). The user action-specific coordinates fed back from the client in the event of a user action are, for example, Cartesian coordinates, in particular coordinates that relate to the size of the display unit or the extent of a window represented on the display unit (respectively in image points). Such user action-specific coordinates can be converted with a per se known transformation rule into polar coordinates. This transformation rule can be regarded as the inverse of the aforementioned transformation rule because, via the transformation rule, a conversion from polar coordinates into Cartesian coordinates and via the inverse, a conversion from Cartesian coordinates into polar coordinates occurs. As soon as, following use of the inverse, possibly after prior use of a linear displacement for centering the coordinate origin, the associated polar coordinates of the image point are established by the server, the server can select the appropriate data point in the data and transmit its detail information to the client. This applies accordingly for other possible transformations and associated inverses.

It is also an object of the present invention to provide a system that comprises a server and at least one client, where the server, i.e., a device functioning as a server and the or each client, specifically a device functioning as a client, each have means for implementing the method as described here and in the following. As means of this type, for example, a computer program with an implementation of the method and, if relevant, individual or all of the embodiments of the method come into consideration. In this regard, the invention is preferably implemented in software. The invention is thus firstly also a computer program with program code instructions executable by a computer and, secondly, a storage medium with such a computer program, i.e., a computer program product with program code means and, finally, also a system with a server and at least one client, where such a computer program is loaded or loadable into a memory store of the respective devices as means for performing the method and its embodiments.

It is clear to a person skilled in the art that in place of an implementation of a method in software, an implementation in firmware or in firmware and software or in firmware and hardware is always possible. Therefore, for the description set forth here, it should be the case that the term software or the term computer program, other implementation possibilities, specifically in particular an implementation in firmware or in firmware and software or in firmware and hardware are included.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention will now be described in greater detail making reference to the drawings. Objects or elements which correspond to one another are provided with the same reference signs in all the drawings, in which.

DETAILED DESCRIPTION OF THE EXEMPLARY EMBODIMENTS

Figure 1:
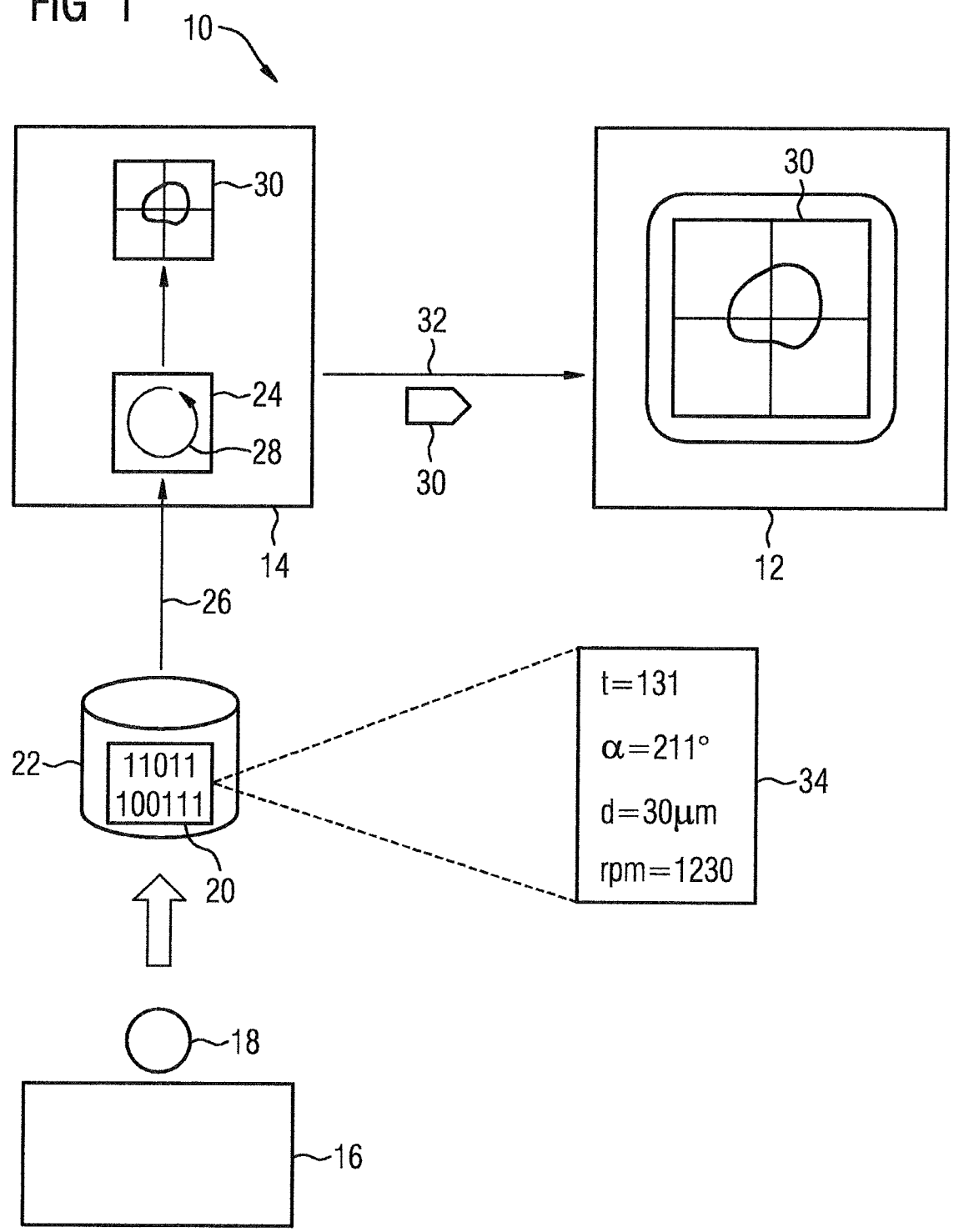
FIG. 1 shows a client-server system intended for transmitting data to produce an interactive image in accordance with the invention.

FIG. 1 shows, in a schematic simplified manner, a client-server system 10 with at least one device functioning as a client 12 and one device functioning as a server 14. The or each client 12 is communicatively connected to the server 14 in a fundamentally per se known manner. For communicative connection, a conductor-bound or conductor-free connection (not shown) comes into consideration. An example of a conductor-bound connection is an Ethernet connection. The following description is continued using the example of a client-server system 10 with exactly one client 12. However, the approach proposed here applies equally for a plurality of clients 12 and, accordingly, a plurality of clients 12 should always be understood as being covered.

The client 12 is, for example, a device in the form of a PC, a laptop or a mobile terminal, such as a Smartphone or a tablet PC. In the client-server system 10, such a client 12 is a "thin client" in the sense that the client 12 functions substantially as a terminal connected to the server 14 and output from the server 14 occurs via a display unit of the client 12 and user input occurs via the peripherals provided therefor (e.g., keyboard, or mouse) of the client 12. Data to be displayed is herein transmitted from the server 14 to the client 12 and data relating to user input is transmitted from the client 12 to the server 14. Memory-intensive and/or computation-intensive processing occurs at the server 14.

The approach proposed here is based on the following scenario: In or on a technical system 16, such as a turbine, via a fundamentally per se known sensor technology 18, data 20 is recorded and stored in a database 22. The data quantity is significant, such as 200 MB and more. With a turbine, for example, due to its rotary speeds in operation and a finely-spaced sampling for the acquisition of, for example, measurement values regarding the vibration behavior, a large data quantity 20 results. The data 20 is present at the server 14, for example, because the acquisition thereof occurs via the server 14 or under the control of the server 14. A representation of the data 20 is to occur at the client 12 via the display unit comprised by the client 12.

The server 14 comprises, in a per se known manner, a processing unit in the form of or in the manner of a microprocessor and a memory store. At least one computer program 24 that determines the functionality of the server 14 is loaded into the memory store. During operation of the client-server system 10, the server 14 accesses the data 20 stored in the memory store of the server 14 or a mass memory store comprised by the server 14 or assigned to the server 14 and data 20 stored there (access 26) and processes it via the processing unit and in accordance with the computer program 24 (processing 28). The result of the processing is at least an image 30 generated based on the data 20 by the server 14, i.e., for example, an image 30 that shows a polar diagram. Belonging to each image point of the image 30 is a data point 34 of the data 20 processed during the generation of the image. In order to produce a respective image point for a data point 34, the server 14 performs a transformation of the type described in the general description part. In the representation of FIG. 1, by way of example, possible data of a data point 34 is represented. The data 20 comprises a plurality of such data points 34 with respectively different data according to the measurement value recording via the sensor system 18.

The production of the image 30 implies a reduction in the underlying data quantity 20. The image 30 can also be stored in a compressed format. The image 30 is transferred from the server 14 to the client 12 (transfer 32) and the client 12 represents the image 30 on its display unit, i.e., typically a screen. For the representation of the image 30 at the client 12, for example, a pre-installed web browser is used, such that no installation of a special client application is necessary. Nevertheless, at the client 12, using a processing unit there in the form or of the type of a microprocessor, at least one computer program (not shown separately in the drawings) is provided that determines the functionality of the client 12. A web browser or the like is an example of a computer program of this type.

Figure 2:
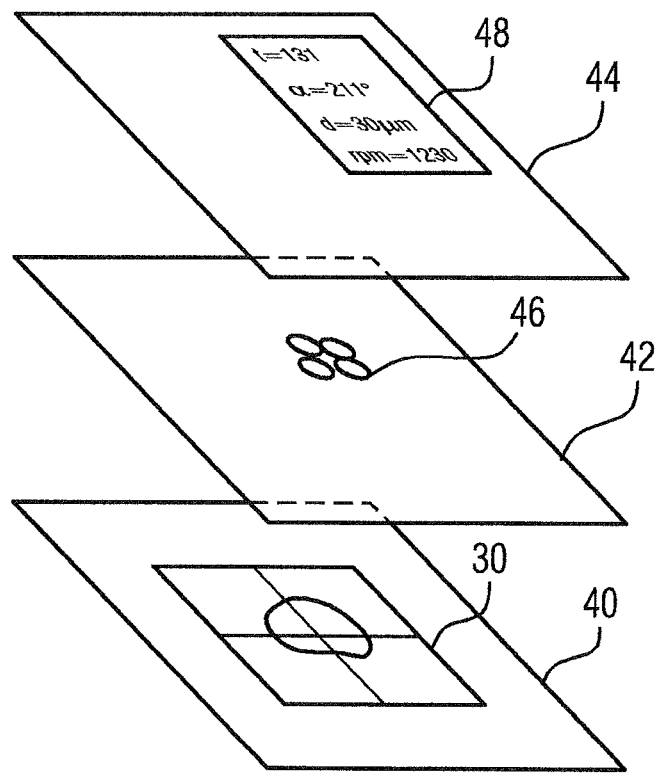
FIG. 2 and FIG. 3 show levels used by the client for representation of the data with data respectively displayed there in accordance with the invention.

The visualization of the data 20 at the client 12 takes place in a preferred embodiment via different levels, as shown schematically simplified in the representation in FIG. 2. The use of two or more levels for overlaying different image content is in principle per se known. Such levels are separately addressable storage regions, the content of which can be selected for representation via the display unit. For differentiation, the levels used with the proposed approach are designated the drawing level 40 and the detail drawing level 42. An optional further level is designated the information level 44.

The image 30 generated by the server 14 and transmitted to the client 12 is represented via the drawing level 40. This means that the data relating to the image 30 received from the server 14 by the client 12 is accepted into the storage region functioning as the drawing level 40. The generation of the image 30 by the server 14 occurs based on the data points 34 stored or at least temporarily stored in the database 22. The results is a static image 30 with static image points.

In the case of continuous monitoring of the respective technical system 16, the server 14 constantly receives additionally established data points 34. These are also stored in the database 22. By comparison with the data (data points 34) underlying the static image 30 already produced, this is designated dynamic data. For the transmission of this dynamic data, at least two options come into consideration. Firstly, the server 14 can transmit to the client 12 the continuously additionally established data points 34. Secondly, the server 14 can process the dynamic data exactly like the data underlying the already produced image 30 and transmit the dynamic image data 46 thereby produced to the client 12. In the first case, the client 12 is responsible for the production of dynamic image data 46 based on at least one respectively acquired data point 34. Herein, it can be provided that for the transfer to the client 12, the server 14 modifies or enhances the data of the data point 34. For example, the server 14 can transmit coordinates to be used as data of the data point 34 for its representation to the client 12. The calculation therefore occurs at the server 14 and the client 12 is thus not burdened. In the second case, the server 14 already supplies the representable dynamic image data 46. Regardless of how and where the dynamic image data 46 is produced, it is accepted at the client 12 in the storage region functioning as the detail drawing level 42. In a combination of the drawing level 40 and the detail drawing level 42 to produce a display via the display unit of the client 12, a combination of the static data of the image 30 and the dynamic image data 46 accordingly results and the client 12 represents the static image 30 together with the dynamic image data 46.

Figure 3:
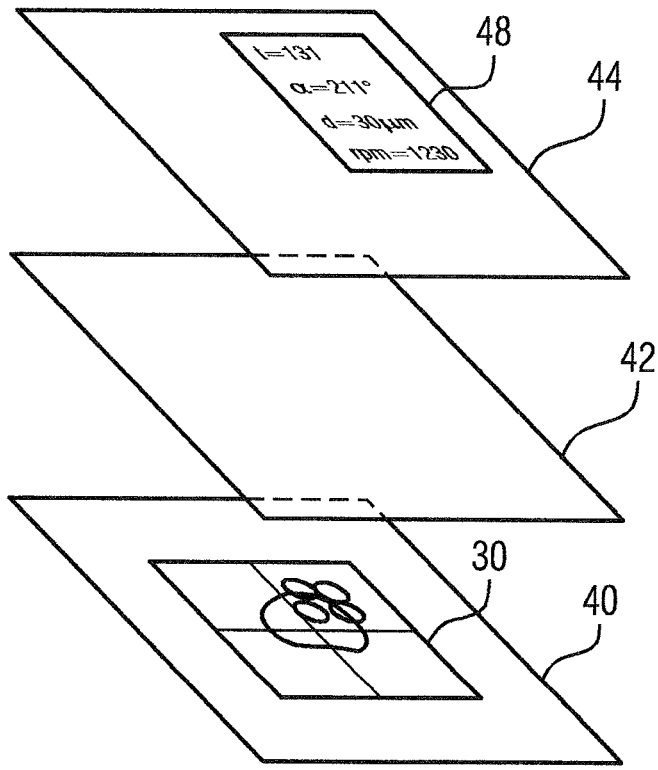

Following a pre-defined or pre-definable time span or following a pre-defined or pre-definable number of additionally established data points 34, the static image 30 is combined with the dynamic image data 46 and an updated image 30 results (see FIG. 3). For the generation of such an updated static image 30 also, at least two options come into consideration. Firstly, the server 14 can generate the updated static image 30 based on the data points 34 stored in the database 22. The generation occurs exactly like the generation of the original or preceding static image 30. The updating via a new generation process results because the database 22 now comprises not only the data points 34 on which the original/preceding static image 30 is based, but also the additionally established data points 34. Secondly, the server 14 can generate the updated static image 30 based on the originally/previously generated image 30 and the additionally established data points 34.

The updated static image 30 is transmitted (transfer 32) to the client 12 and the client 12 represents it in place of the previously displayed static image 30 and the previously displayed dynamic image data 46 via the display unit, as shown simplified in the representation of FIG. 3.

The display of the new static image 30 in place of the previous static image 30 and the previously displayed dynamic image data 46 occurs particularly easily in the use of different levels for the representation, specifically at least one drawing level 40 and one detail drawing level 42 in that the content of the detail drawing level 42 is deleted and the updated static image 30 is loaded in place of the previous data there into the storage region functioning as the drawing level 40.

With the continual repetition of these steps (transmission and display of a static image 30; transmission and display of enhancing dynamic image data 46; combining the static image 30 with the dynamic image data 46 to obtain a new static image 30), a continuously updated representation of the data 20 recorded in relation to the respective technical system 16 can occur in an efficient manner.

The representations in FIG. 2 and FIG. 3 show a fundamentally optional information level 44. With this, detail information 48 can be displayed at the client 12. As detail information 48, additional data of an image point of the static image 30 or of the dynamic image data 46, specifically additional data of the respective underlying data point 34 is displayed.

If the static image 30 or the static image 30 and the dynamic image data 46 is displayed at the client 12, this or these is/are available not only for a visual interpretation by a user, but also for a further-reaching interaction. Such an interaction designated below as a user action consists, for example, therein that the user selects, via a peripheral device of the client 12, i.e., for example, a mouse or the like, an image point of the display unit and thus an image point of the static image 30 or of the dynamic image data 46 for the receipt of a further information item. The static image 30 or the dynamic image data 46 itself does not contain this further information. However, the further information is a component of the data 20 underlying the image 30 or the dynamic image data 46. In order to receive the further information, in the case of a user action at the client 12, user action-specific coordinates 50 are established and transmitted to the server 14.

Figure 4:
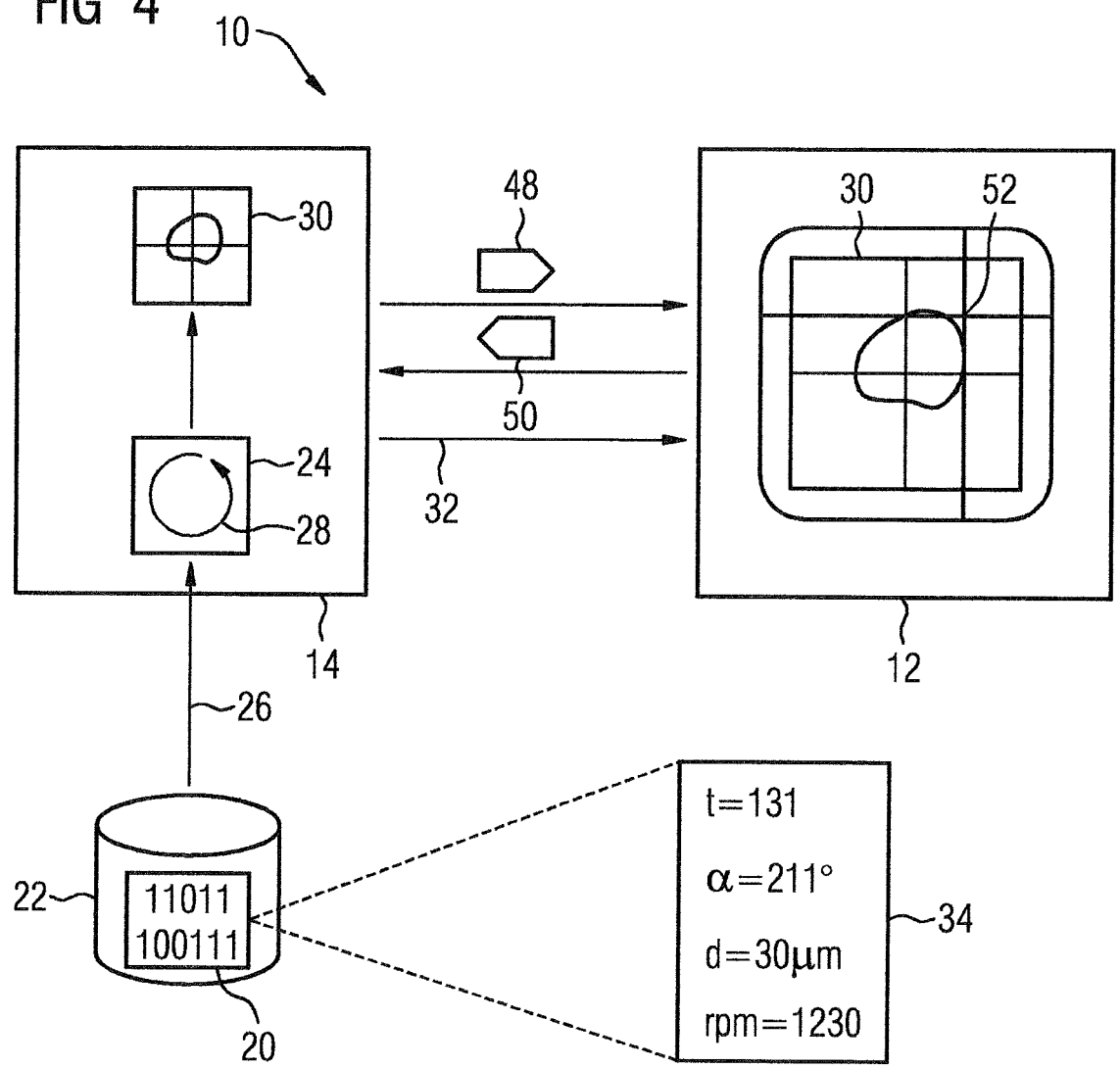
FIG. 4 shows a request to the server for data by the client in accordance with the invention.

For this purpose, in the representation in FIG. 4, which is essentially a repetition of FIG. 1, a graphic cursor 52 at the client 12 is shown. This is movable in a per se known manner in relation to the image 30 displayed by the client 12 or in relation to the image 30 and the dynamic image data 46 displayed by the client 12 (the further description is continued, for the sake of better readability, purely on the basis of the static image 30), so that an individual image point can be selected. Such a selection is an example for a user action and the user action-specific coordinates 50 correspond to the respective position of the graphic cursor 52. These are transmitted to the server 14 and the server 14 establishes the respectively associated data point 34 for them. The information encompassed thereby is transmitted as detail information 48 to the client 12 which displays it via the information level 44.

For the automatic establishment of the detail information 48 via the server 14 based on the user action-specific coordinates 50, it should be realized that the image 30 is the result of an interpretation of the data 20 at the server. A transformation rule underlying this interpretation thus defines a conversion of the data 20 into image points of the image 30 and the location of the respective image point. The user action-specific coordinates 50 denote, for example, the image point within the image 30 to which the action of the user relates. Through an inverse of the transformation rule underlying the original interpretation of the data 20 by the server for generation of the image 30, from such coordinates 50, the underlying data point 34 can be established. Once this has been established, everything that during the original generation of the image 30 has not flowed into it can be transmitted as detail information 48 to the client 12 and is represented by the client 12 correctly positioned in relation to the image 30, i.e., at the location of the user action or in the vicinity of the location of the user action.

With regard to the detail information 48 also, it can be provided that the server 14 transmits the respective data to the client 12 and the client 12 itself provides for the representation of this data. Alternatively, the server 14 can generate an image (detail information image) based on the detail information 48 and transmit it to the client 12. The client 12 can display such a detail information image directly without further processing, in particular in that its data is loaded into the storage region functioning as the information level 44.

In the case of a creation of such an interactive image or detail information image by the server 14, the image is preferably generated so that the resulting representation of the detail information 48 occurs in a spatial relation to the user action-specific coordinates 50, i.e., for example, the position of the graphic cursor 52. The server 14 has the user action-specific coordinates 50 already available as the basis for the establishment of the associated data point 34. On the basis thereof, the server 14 can generate a detail information image comprising a graph of the detail information 48 where in this, the graph is positioned according to the respective user action-specific coordinates 50. Herein, account is specifically also taken of when the graphic cursor 52 is close to one of the lateral edges of the static image 30 and the detail information 48 is positioned so that its complete representation is possible via the display unit of the client 12.

Whenever a new detail information item 48 is to be represented in response to a new user action, this is particularly efficiently possible on use of a separate level, specifically the information level 44. Either the content of the storage region functioning as the information level 44 is deleted and subsequently the graphic for a representation of the detail information 48 is generated and/or loaded positionally correctly into the storage region. Alternatively, the storage region functioning as the information level 44 is overwritten with the respective detail information 48, where the detail information 48 is generated such that a complete replacement of the previous content of the relevant storage region results.

The renewal proposed herein is therefore an efficient method for transmitting data in order to produce an interactive image based on historical mass data 20 and continuously added data 20 via a client-server system 10, in particular a client-server system 10 with a client 12 in the form of a thin client. During the representation of the data, the possibility constantly exists of obtaining information (detail information 48) relating to details not directly acquired from the transmission and display or not directly recognizable based on the representation of the data.

Figure 5:
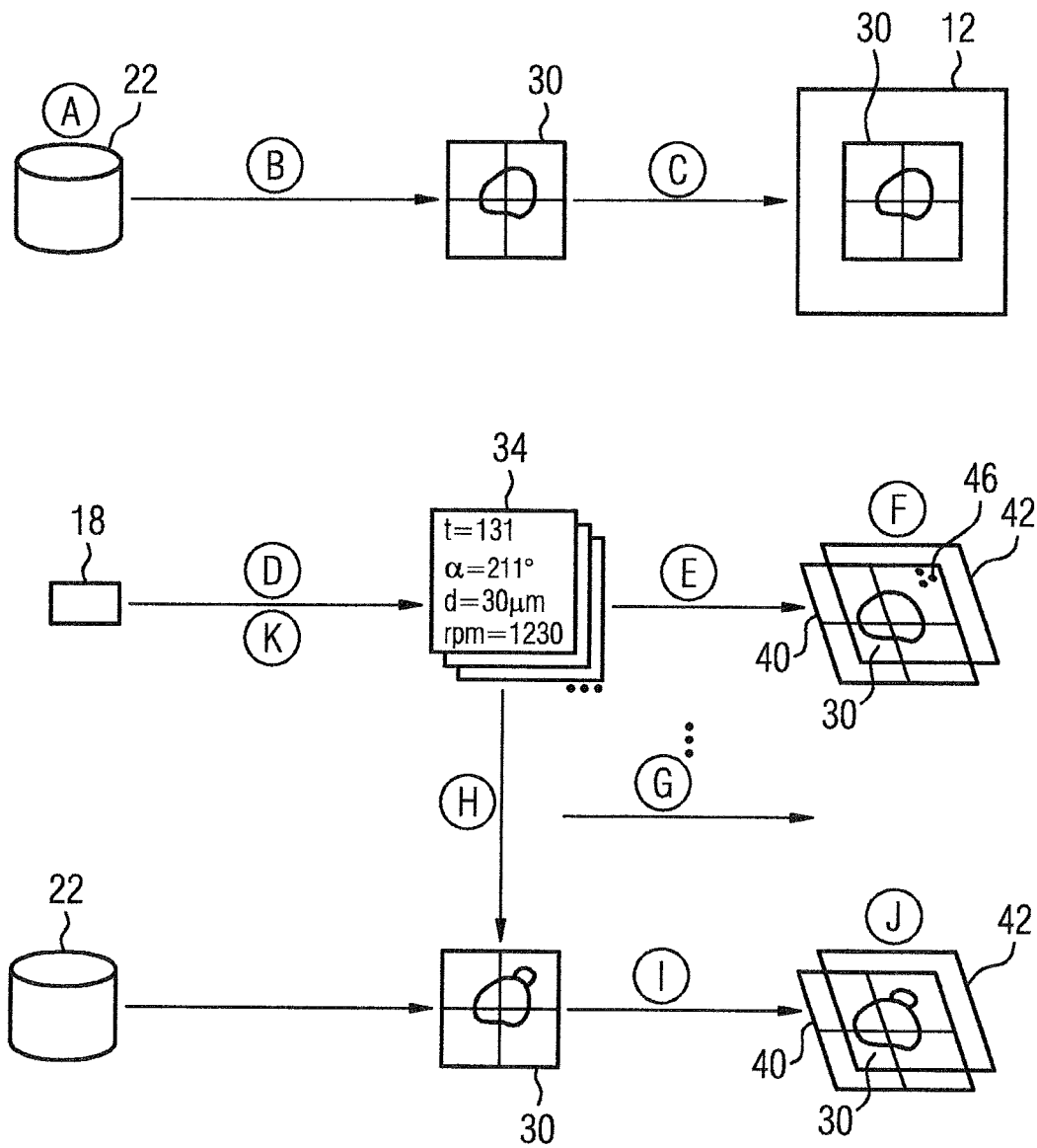
FIG. 5 shows an overview of an embodiment of the method, in accordance with the invention.

The illustration in FIG. 5 summarizes the statements above. The following description relating to this is therefore also to be understood as merely a brief summary of the previous explanations. The relation to the drawing is represented here with successive upper case letters.

A: The data 20 (FIG. 1) to be visualized is stored in a database 22 or will be stored there during the course of the method.
B: Based on the data 20 stored in the database 22, the server 14 generates a static image 30 (FIG. 1).
C: The static image 30 is transmitted to the client 12 and is represented there via a display unit of the client 12.
D: A sensor system 18 associated with a respective technical system 16 (FIG. 1) continuously supplies further data 20 in the form of additionally established data points 34.
E: Each new data point 34 or dynamic image data 46 generated based on new data points 34 is or are transmitted to the client 12.
F: Dynamic image data 46 received from the server 14 or generated by the client 12 based on new data points 34 is displayed together with the static image 30 via the display unit of the client 12. For this purpose, different levels are used at the client 12, specifically a drawing level 40 for the static image 30 and a detail drawing level 42 for the dynamic image data 46.
G: The steps D, E and F are repeated in a time-dependent or data-dependent manner, i.e., for example, for the duration of a pre-defined or pre-definable time span or until a particular number of new data points 34 has been established.
H: Subsequently to the time-dependent or data-dependent repetition of the steps D, E and F, a new static image 30 is generated by the server 14.
I: The new static image 30 is transmitted to the client 12 and is represented there.
J: The representation occurs via the drawing level 40 and the detail drawing level 42. The new static image 30 is loaded into the drawing level 40 and the detail drawing level 42 is deleted.
K: The method is continued at point D, provided the process is not terminated.

The previous description related to data 20 that can be visualized, for example, in the form of a polar diagram or the like, i.e., a diagram by which at least in principle all the available data 20 can be represented simultaneously. A peculiarity lies in a representation of the data 20 in the form of a so-called y/t diagram, i.e., a diagram in the representation of which successive old data 20 is omitted on one side and on the opposite side, new data 20 is added.

Figure 6:
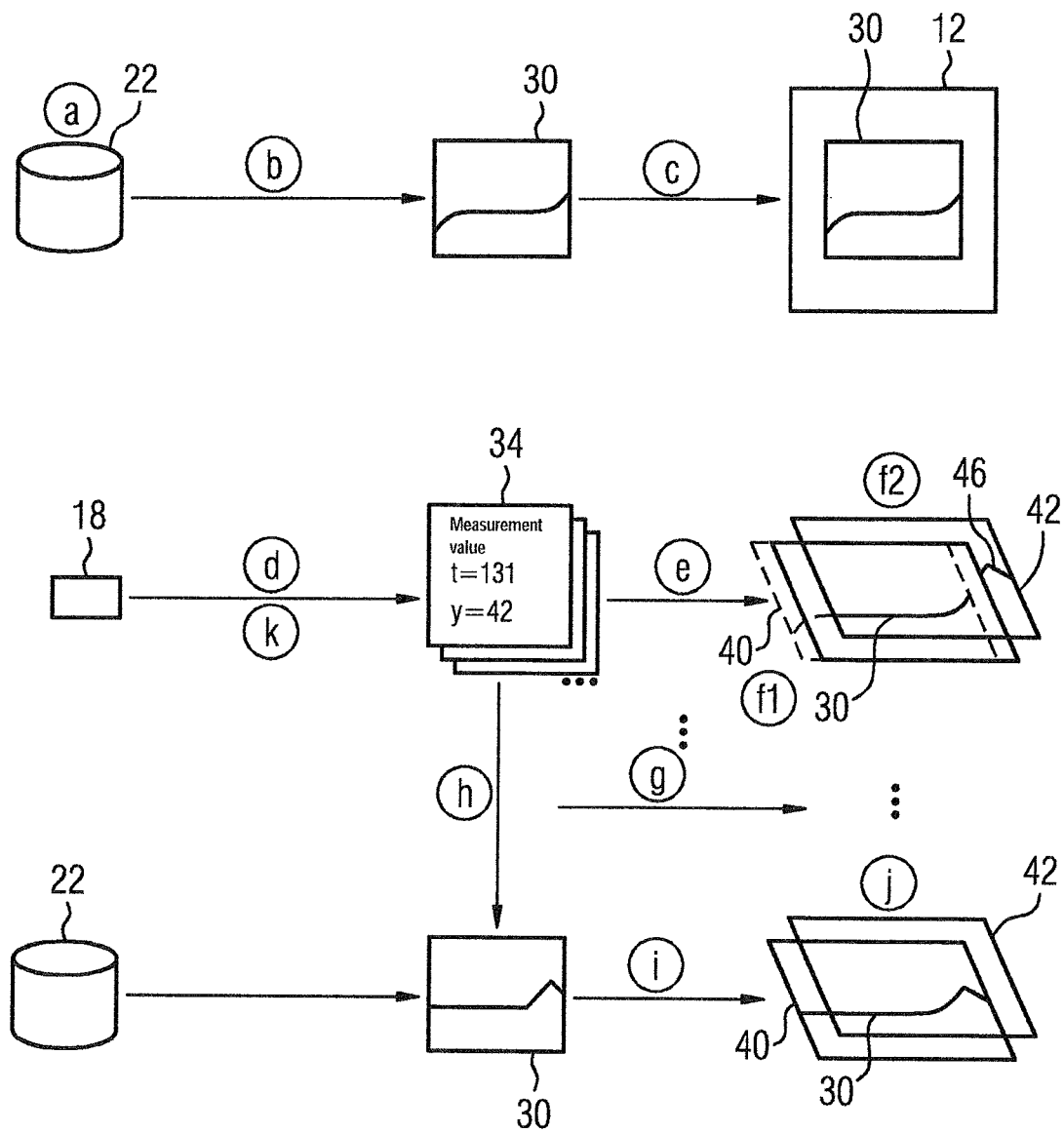
FIG. 6 shows an overview as per FIG. 5 of a particular embodiment of the method in accordance with the invention.

Here, the proposed approach is also suitable for the representation of historical mass data 20 and continuously added data 20 in the form of such a y/t diagram via a client-server system 10. The sequence is only slightly different from that previously described and will be explained below based on the illustration in FIG. 6. The illustration in FIG. 6 is based as far as possible on the illustration in FIG. 5, to which and to the associated description of which reference is here expressly made. In order to distinguish it from the illustration in FIG. 5, reference to the illustration is created in this case with lower case letters.

a: The data 20 (FIG. 1) to be visualized is stored in a database 22 or will be stored there during the course of the method.
b: Based on the data 20 present in the database 22, the server 14 generates a static image 30 (FIG. 1).
c: The static image 30 is transmitted to the client 12 and is represented there via a display unit of the client 12 in the drawing level 40 provided therefor.
d: A sensor system 18 associated with a respective technical system 16 (FIG. 1) continuously supplies further data 20 in the form of additionally established data points 34.
e: Each new data point 34 or dynamic image data 46 generated based on new data points 34 is or are transmitted to the client 12.
f1: The static image 30 is displaced in the drawing level 40 by the equivalent of a pre-defined or pre-definable time difference $\Delta t$ in a pre-defined or pre-definable direction, typically to the left. The time difference $\Delta t$ can result from the temporal spacing between the last established new data point 34 and the immediately preceding data point 34. The displacement has the effect that a representation of older data points 34 on a displacement to the left, i.e., data points 34 lying at the left edge of the representation are faded out, whereas at the right image edge, a free region arises.
f2: The dynamic image data 46 received from the server 14 or generated by the client 12 based on new data points 34 is displayed together with the displaced static image 30 via the display unit of the client 12, where the dynamic image data 46 is displayed via the detail drawing level 42.
g: The steps d, e as well as f1 and f2 are repeated in a time-dependent or data-dependent manner, i.e., for example, for the duration of a pre-defined or pre-definable time span or until a particular number of new data points 34 has been established, where in each case the representation of the dynamic data 46 (step f2) is also displaced in the detail drawing level 42 in the same way as the static image 30 in the drawing level 40.
h: Subsequently to the time-dependent or data-dependent repetition of the steps d, e as well as f1 and f2, a new static image 30 is generated by the server 14.
i: The new static image 30 is transmitted to the client 12 and is represented there.
j: The representation occurs via the drawing level 40 and the detail drawing level 42. The new static image 30 is loaded into the drawing level 40 and the detail drawing level 42 is deleted.
k: The method is continued at point d, provided the process is not terminated.

It should be added with regard to the illustrations in FIG. 5 and FIG. 6 that conceptually, in a preferred embodiment of the method which also permits a representation of a detail information item 48, from point C or from point c, a visualization of the data 20 in an image together with a representation, occurring following an interaction, of a detail information item 48 is possible, as described above.

Finally, it should be noted that each formulation that describes or implies an action of the client 12 or the server 14, for example, a formulation such as "the server 14 generates the image 30 from the data 20" should be understood as meaning that the respective device 12, 14 performs the respective action based on and under control of a computer program. In a per se known manner, for this, the client 12 and the server 14 comprise a processing unit in the form of or in the manner of a microprocessor and a memory store in which a computer program executable via the processing unit and executed during operation is loaded. The computer program determines the functionality of the respective device 12, 14 and is thus a means for implementing the respective action and for implementing the or each of the method steps comprised by the respective action. This should always be borne in mind when considering the description set forth here.

Although the invention has been illustrated and described in detail with the preferred exemplary embodiment, the invention is not restricted by the examples given and other variations can be derived therefrom by a person skilled in the art without departing from the protective scope of the invention.

Individual significant aspects of the description set forth here can thus be briefly summarized as follows: What is disclosed is a method for transmitting data 30, 34, 46, 48, 50 to produce an interactive image, a computer program for implementing the method and a client-server system 10 functioning according to the method, where the data 20 comprises, firstly, already recorded data and, secondly, data added as a result of continuous measurements or the like, wherein the server 14 generates a static image 30 based on the already recorded data and transmits this to the client 12 for representation, where based on the added data, the server 14 generates dynamic image data 46 and also transmits this to the client 12 for representation or transmits the added data to the client 12 for the production of dynamic image data 46 by the client 12, where the server 14 generates, in a time-dependent or data quantity-dependent manner, an updated static image 30 based on the data 20 present at the relevant time point or in the form of a combination of the previous static image 30 and of the dynamic image data 46 and transmits it in place of the previous static image 30 and the dynamic image data 46 to the client 12.

Figure 7:
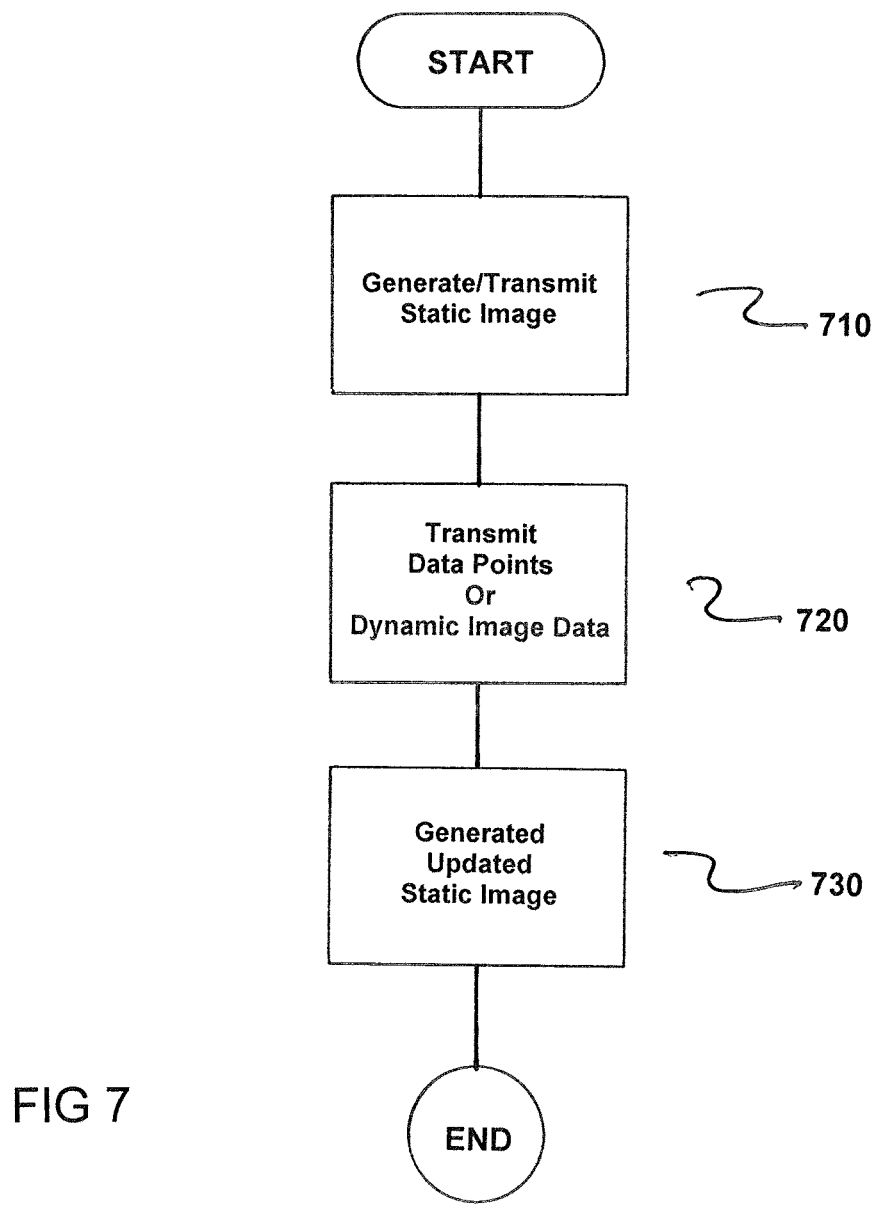
FIG. 7 is a flowchart of the method in accordance with the invention.

FIG. 7 is a flowchart of a method for transmitting data 30, 34, 46, 48, 50 to produce an interactive image via a client-server-system 10 in which a first device functions as a server 14 and a second device communicatively connected to the first device functions as a client 12, where data 20 is present as data points 34. The method comprises generating, by the server 14, a static image 30 based on data points 34 stored in a database 22 and transmitting said static image 30 to the client 12, as indicated in step 710. Here, the client 12 represents the static image 30 received from the server 14 via a display unit;

Next, the server 14 continuously transmits to the client 12 data points 34 that are additionally established and stored in the database 22 or transmits dynamic image data 46 generated based on data points 34 continuously additionally established and stored in the database 22, as indicated in step 720. In accordance with the method of the invention, the client 12 represents the static image 30 together with the dynamic image data 46 received from the server 14 or together with dynamic image data 46 generated by the client 12 based on the additionally established data points 34 received from the server 14 via the display unit.

The server 14 now generates an updated static image (30') following a pre-defined or pre-definable time span or following a pre-defined or pre-definable number of additionally established data points (34) based on the data points (34) stored in the database (22) or based on the static image (30) originally generated and the additionally established data points (34), as indicated in step 730. Here, the server (14) transmits the static image (30) to the client (12) and the client represents the static image (30) received from the server (14) in place of a previously displayed static image (30) and a previously displayed dynamic image data (46) via the display unit.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data to produce an interactive image via a client-server-system in which a first device functions as a server and a second device communicatively connected to the first device functions as a client, data being present as data points, the method comprising:
    generating, by the server, a static image based on data points stored in a database and transmitting said static image to the client, said client representing the static image received from the server via a display unit;
    transmitting, by the server continuously to the client, data points which are additionally established and stored in the database or transmitting by the server dynamic image data generated based on data points continuously additionally established and stored in the database, the client represents the static image together with the dynamic image data received from the server or together with dynamic image data generated by the client based on the additionally established data points received from the server via the display unit; and
    generating, by the server, an updated static image following a pre-defined or pre-definable time span or following a pre-defined or pre-definable number of additionally established data points based on the data points stored in the database or based on the static image originally generated and the additionally established data points, said server transmitting said static image to the client and the client representing the static image received from the server in place of a previously displayed static image and a previously displayed dynamic image data via the display unit.

2. The method as claimed in claim 1, wherein the client represents the static image received from the server in a drawing level and represents the dynamic image data resulting based on the additionally established data points in a detail drawing level residing above the drawing level.

3. The method as claimed in claim 2, wherein for visualizing the data as a y/t diagram, following a first representation of the static image and in relation to a first representation of the dynamic image data, a displacement of the representation of the static image and, in relation to further representations of dynamic image data, a displacement of the representation of the static image and a similar displacement of the representation of the dynamic image data occurs.

4. The method as claimed in claim 2, wherein in cases of a user action relating to the static image or the dynamic image data, user action-specific coordinates are transmitted to the server, the server establishes an associated data point on receipt of the coordinates in the data and transmits detail information thereof to the client which represents the detail information at a location of the user action.

5. The method as claimed in claim 1, wherein for visualizing the data as a y/t diagram, following a first representation of the static image and in relation to a first representation of the dynamic image data, a displacement of the representation of the static image and, in relation to further representations of dynamic image data, a displacement of the representation of the static image and a similar displacement of the representation of the dynamic image data occurs.

6. The method as claimed in claim 5, wherein in cases of a user action relating to the static image or the dynamic image data, user action-specific coordinates are transmitted to the server, the server establishes an associated data point on receipt of the coordinates in the data and transmits detail information thereof to the client which represents the detail information at a location of the user action.

7. The method as claimed in claim 1, wherein in cases of a user action relating to the static image or the dynamic image data, user action-specific coordinates are transmitted to the server, the server establishes an associated data point on receipt of the coordinates in the data and transmits detail information thereof to the client which represents the detail information at a location of the user action.

8. The method as claimed in claim 7, wherein the client represents the detail information received from the server in an information level residing above the drawing level and the detail drawing level.

9. The method as claimed in claim 8, wherein the server, upon generating the static image, in particular upon generating the static image and the dynamic image data, utilizes a transformation rule for converting the data points into image points of the static image or the dynamic image data; and wherein the server applies an inverse of the transformation rule on the user action-specific coordinates to establish a data point associated with the user action-specific coordinates.

10. The method as claimed in claim 7, wherein the server, upon generating the static image, in particular upon generating the static image and the dynamic image data, utilizes a transformation rule for converting the data points into image points of the static image or the dynamic image data; and wherein the server applies an inverse of the transformation rule on the user action-specific coordinates to establish a data point associated with the user action-specific coordinates.

11. A non-transitory computer-readable medium encoded with a computer program which, when executed by a server, causes transmission of data to produce an interactive image via a client-server-system in which a first device functions as the server and a second device communicatively connected to the first device functions as a client, the computer program comprising:
program code for generating, at the server, a static image based on the data and for transmitting the static image to the client;
program code for processing continuously, at the server, additionally established data points and for one of (i) transmitting additionally established data points to the client or (ii) transmitting to the client dynamic image data generated based the additionally established data points; and
program code for generating an updated static image based on one of (i) the additionally established data points stored in the database and (ii) the static image originally generated and the additionally established data points after expiry of a pre-defined or pre-definable time span or following a pre-defined or pre-definable number of additionally determined data points and transmission of the updated static image to the client.

12. The non-transitory computer-readable medium as claimed in claim 11, further comprising:
program code for receiving user action-specific coordinates from the client to establish a data point belonging thereto and its detail information and for transmitting the detail information to the client.

13. A client-server system comprising:
a device functioning as a server; and
at least one further device functioning as a client;
wherein the server and each client includes a respective processing unit and a respective memory store into which a computer program which is executable by the respective processing unit is loadable; and
wherein the computer program encoded in the non-transitory computer-readable medium of claim 11 is loaded into the memory store of the client.

14. A non-transitory computer-readable medium encoded with a computer program which, when executed by a server, causes transmission of data to produce an interactive image via a client-server-system in which a first device functions as the server, and a second device communicatively connected to the first device functions as a client, the computer program comprising:
program code for representing, at the client, an image received from the server, via a display unit;
program code for receiving, at the client, dynamic image data from the server and for representing the image together with the dynamic image data via the display unit; and
program code for receiving an updated static image from the server and for representing the updated static image in place of a previously displayed static image and a previously displayed dynamic image data via the display unit.

15. The non-transitory computer-readable medium as claimed in claim 14, further comprising:
program code for, in cases of a user action related to one of (i) the image and (ii) the image and the dynamic image data, receiving user action-specific coordinates and for transmitting said received user action-specific coordinates to the server and for receiving a detail information item from the server and for representing said received detail information item at a location of the user action.

16. A client-server system comprising:
a device functioning as a server; and at least one further device functioning as a client;
wherein the server and each client includes a respective processing unit and a respective memory store into which a computer program which is executable by the respective processing unit is loadable; and
wherein the computer program encoded in the non-transitory computer-readable medium of claim 14 is loaded into the memory store of the server.

\* \* \* \* \*